(12) United States Patent
Wilson et al.

(10) Patent No.: US 7,560,742 B2
(45) Date of Patent: Jul. 14, 2009

(54) SEMICONDUCTOR-BASED LIGHTING SYSTEMS AND LIGHTING SYSTEM COMPONENTS FOR AUTOMOTIVE USE

(75) Inventors: Chris Wilson, Belleville (CA); Chad D. Lambert, Belleville (CA); Ronald O. Woodward, Yorktown, VA (US); Cole J. Cunnien, Canton, MI (US)

(73) Assignee: Magna International Inc. (CA)

( * ) Notice: Subject to any disclaimer, the term of this patent is extended or adjusted under 35 U.S.C. 154(b) by 64 days.

(21) Appl. No.: 11/393,023

(22) Filed: Mar. 30, 2006

(65) Prior Publication Data

US 2007/0120137 A1    May 31, 2007

Related U.S. Application Data

(60) Provisional application No. 60/740,125, filed on Nov. 28, 2005.

(51) Int. Cl.
*H01L 33/00* (2006.01)
(52) U.S. Cl. .................. 257/98; 257/99; 257/E33.073; 257/E33.075
(58) Field of Classification Search .................. 257/98, 257/99, E33.058, E33.075, E33.056, E33.073; 362/511, 538, 547, 548
See application file for complete search history.

(56) References Cited

U.S. PATENT DOCUMENTS

| | | | |
|---|---|---|---|
| 3,911,430 A * | 10/1975 | Jankowski et al. ..... | 340/815.42 |
| 5,499,166 A | 3/1996 | Kato et al. | |
| 5,555,161 A * | 9/1996 | Roe et al. ................ | 362/555 |
| 5,575,551 A | 11/1996 | Horii | |
| 6,749,320 B1 * | 6/2004 | Hartley .................. | 362/184 |
| 2002/0145871 A1 * | 10/2002 | Yoda ..................... | 362/241 |
| 2004/0008952 A1 * | 1/2004 | Kragl .................... | 385/88 |
| 2004/0149998 A1 * | 8/2004 | Henson et al. .......... | 257/98 |
| 2005/0018446 A1 * | 1/2005 | Ishida ................... | 362/545 |
| 2005/0116635 A1 * | 6/2005 | Walson et al. .......... | 313/512 |
| 2007/0127258 A1 * | 6/2007 | Wang et al. ............ | 362/559 |

FOREIGN PATENT DOCUMENTS

| | | |
|---|---|---|
| DE | 100 62 103 A1 | 7/2002 |
| EP | 0 678 699 A1 | 10/1999 |
| EP | 1 213 178 A2 | 6/2002 |
| FR | 2 797 678 | 2/2001 |
| FR | 2 855 866 | 12/2004 |

\* cited by examiner

*Primary Examiner*—Minh-Loan T Tran
(74) *Attorney, Agent, or Firm*—Warn Partners, P.C.; Marc Luddy

(57) ABSTRACT

A modular semiconductor light source assembly includes a semiconductor light source, such as a light emitting diode, which is mounted on a substrate which supplies electricity to the light source and which assists in removing waste heat therefrom. Substantially all of the light emitted by the LED is transferred to a lens by a light pipe, the cross section of the light pipe increasing from the light source to the lens and the lens having a general D-shape such that the light pattern formed by the lens is constrained in a first direction orthogonal to a second direction. The assembly can be combined with other similar assemblies or other light sources in a light fixture to produce a desired overall beam pattern such as a automobile headlamp low beam or high beam pattern.

21 Claims, 8 Drawing Sheets

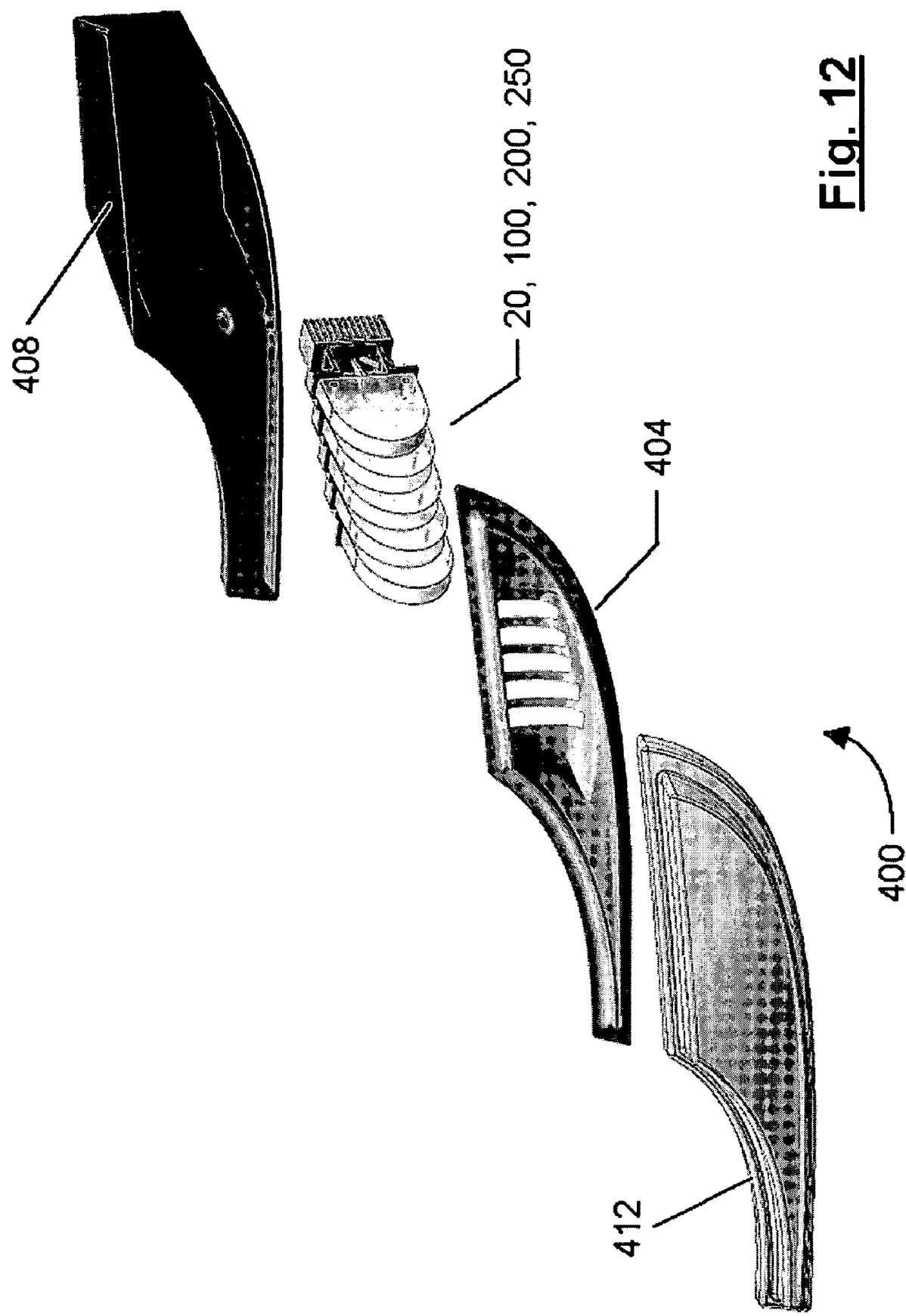

SEMICONDUCTOR-BASED LIGHTING SYSTEMS AND LIGHTING SYSTEM COMPONENTS FOR AUTOMOTIVE USE

CROSS-REFERENCE TO RELATED APPLICATIONS

This application claims the benefit of U.S. Provisional Application No. 60/740,125, filed Nov. 28, 2005.

FIELD OF THE INVENTION

The present invention relates to lighting sources for automotive lighting. More specifically, the present invention relates to semiconductor-based lighting systems and lighting system components for use in automotive lighting systems.

BACKGROUND OF THE INVENTION

With recent advances in semiconductor light sources, such as high output white light emitting diodes (LEDs), interest has developed in employing light elements which utilize semiconductor light sources to construct automotive lighting systems such as headlamps, warning lamps, fog lamps and signaling lamps. Such semiconductor light elements can offer a variety of advantages over conventional incandescent and gas discharge light sources, including much smaller required volumes for the light elements with semiconductor sources, resulting in a wider range of possible designs and styling, as well as potentially increased longevity and reliability.

However, light elements employing semiconductor sources also suffer from disadvantages, including lower light output levels than comparable incandescent and/or gas discharge light sources and a sensitivity to over-heating of the semiconductor light source which can result in failure of the semiconductor light sources.

SUMMARY OF THE INVENTION

It is an object of the present invention to provide a novel semiconductor light source assembly which obviates or mitigates at least one disadvantage of the prior art.

According to a first aspect of the present invention, there is provided a modular semiconductor light source assembly comprising: a substrate; a semiconductor light source mounted to the substrate, the substrate providing electrical power to the semiconductor light source and removing waste heat generated by the semiconductor light source; a heat sink in thermal communication with the substrate to remove waste heat therefrom; a light pipe having a first end adjacent the semiconductor light source, to capture substantially all of the light emitted from the semiconductor light source, and a second end; and a lens having a general D-shape, the second end of the light pipe engaging the lens such that the light from the emitted by the semiconductor light source is emitted from the lens in a pattern wherein the emitted light is spread in a first direction and is constrained in a second direction, the second direction being orthogonal to the first.

Preferably, the semiconductor light source is a light emitting diode.

The present invention provides a modular semiconductor light source assembly which includes a semiconductor light source, such as a light emitting diode, which is mounted on a substrate which supplies electricity to the light source and which assists in removing waste heat therefrom. Substantially all of the light emitted by the LED is transferred to a lens by a light pipe, the cross section of the light pipe increasing from the light source to the lens and the lens having a general D-shape such that the light pattern formed by the lens is constrained in a first direction orthogonal to a second direction. The assembly can be combined with other similar assemblies or other light sources in a light fixture to produce a desired overall beam pattern such as a automobile headlamp low beam or high beam pattern or a fog lamp or driving lamp pattern.

BRIEF DESCRIPTION OF THE DRAWINGS

Preferred embodiments of the present invention will now be described, by way of example only, with reference to the attached Figures, wherein:

FIG. 12 shows an exploded view of the driving or fog lamp fixture of FIG. 11.

DETAILED DESCRIPTION OF THE INVENTION

As described above, light elements constructed with semiconductor light sources suffer from disadvantages in that the amount of light emitted by semiconductor light sources, such as light emitting diodes (LEDs) is generally less than the light emitted by incandescent or gas discharge light sources. Further, semiconductor light sources are sensitive to over-heating conditions and operation of the semiconductor light source with excessive semiconductor junction temperatures will decrease the expected operating lifetime of the semiconductor light source.

Accordingly, the present inventors have determined that semiconductor lighting systems must include optics which are carefully designed to efficiently form desired beam patterns with the light emitted by the semiconductor light source. Further, the semiconductor lighting systems must allow for sufficient cooling of the semiconductor light source therein to prevent the semiconductor junction temperature from exceeding the acceptable operating temperature range during normal operating conditions.

At the same time, the present inventors have also determined that automotive lighting systems employing semiconductor light sources are particularly suited to construction from modular light source components.

Figure 1:
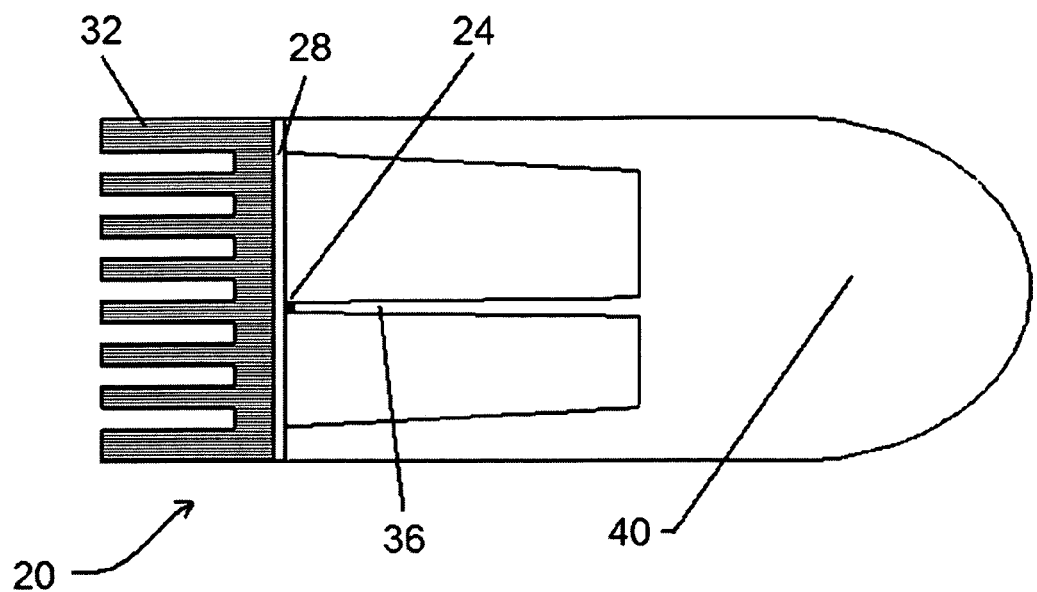
FIG. 1 shows a side view of a modular semiconductor light source assembly in accordance with the present invention.

In FIG. 1 a modular semiconductor light source assembly in accordance with the present invention is indicated generally at 20. Light source assembly 20 comprises a semiconductor light source, such as light emitting diode (LED) 24, which is mounted to a substrate 28. Substrate 28 can be any suitable substrate on which LED 24 can be mounted, but preferably substrate 28 is a printed circuit board which provides electrical connections to LED 24 and which assists in transferring waste heat from LED 24. For example, substrate 28 can be an epoxy or phenolic-based member which includes electrically conductive traces on its surface and which includes a layer of heat transfer material, such as aluminum or copper. A heat sink 32 is attached to substrate 28 to accept heat waste heat from LED 24 via substrate 28. Heat sink 32 can be formed from aluminum or any other suitable heat transfer material as will occur to those of skill in the art. It is contemplated that, if it is desired to employ two or more of assemblies 20 in a light fixture, as described below, then heat sink 32 and/or substrate 28 can be common to each assembly 20.

The light which is emitted by LED 24 at its surface opposite substrate 28 is captured by a light pipe 36 which abuts the emitting surface of LED 24 to capture substantially all of the light emitted by LED 24. Light pipe 36 can be a fiber optic cable, a light guide manufactured from polycarbonate or transparent silicone rubber or moldable acrylic resins, such as Acrymid™ 815, sold by CYRO Industries of Rockaway, N.J., or any other suitable method of transferring light from a light source to a desired location To ensure the capture of substantially all of the light emitted by LED 24, the diameter of light pipe 36 preferably tapers from its smallest cross section, adjacent LED 24 where it is preferably at least as large as the light emitting surface of LED 24, to a larger cross section where light pipe 36 contacts a lens 40. Lens 40 can be fabricated of any suitable material, such as polycarbonate, silicone rubber or moldable acrylic resins, such as Acrymid™ 815, provided only that the selected material preferably has an index of refraction which is equal to or greater than the index of refraction of light pipe 36.

Light pipe 36 is optically connected to lens 40 such that substantially all of the light emitted by LED 24 is transferred to lens 40. If light pipe 36 is fabricated from the same material as lens 40, such as if both are acrylic, then light pipe 40 can be optically connected to the lens by fusing light pipe 36 to lens 40. If light pipe 36 and lens 40 are dissimilar materials, such as transparent silicone rubber and acrylic respectively, then light pipe 36 can be optically connected to lens 40 by abutting it against lens 40 and applying a suitable adhesive or by any other suitable manner as would occur to those of skill in the art.

In the present invention, it is presently preferred that light pipe 36 and lens 40 be manufactured as a single component, for example by molding them from acrylic, to avoid tolerancing difficulties which may otherwise occur in aligning the optical interfaces/connections between light pipe 36 and lens 40.

Figure 2:
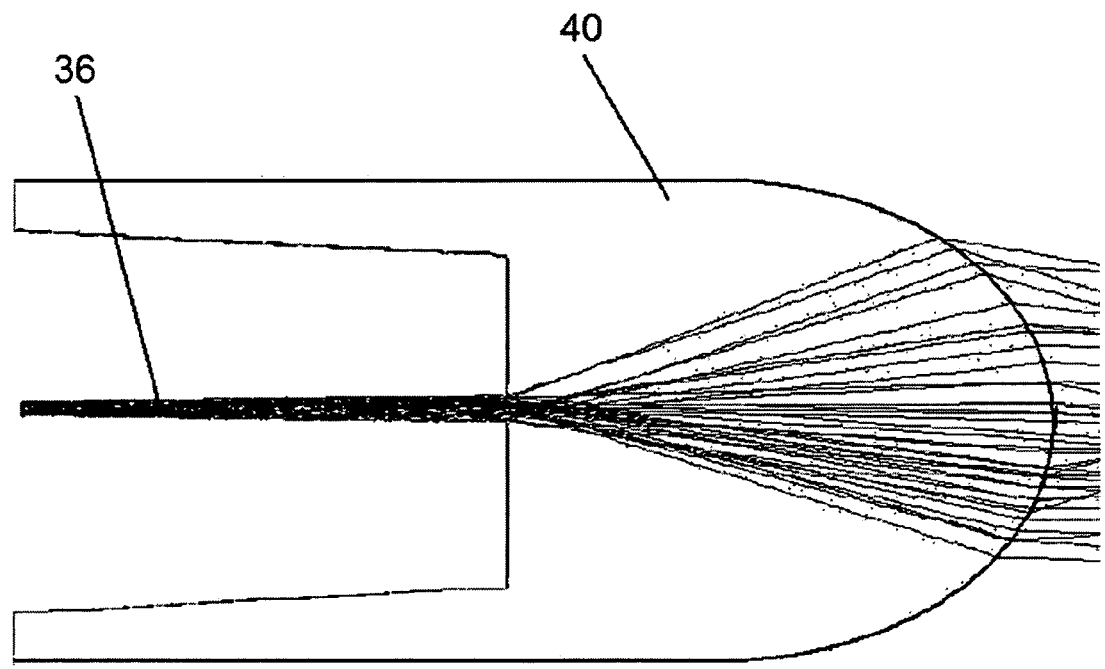
FIG. 2 shows a ray diagram illustrating the refraction of light through a light pipe and lens of the assembly of FIG. 1.
Figure 3:
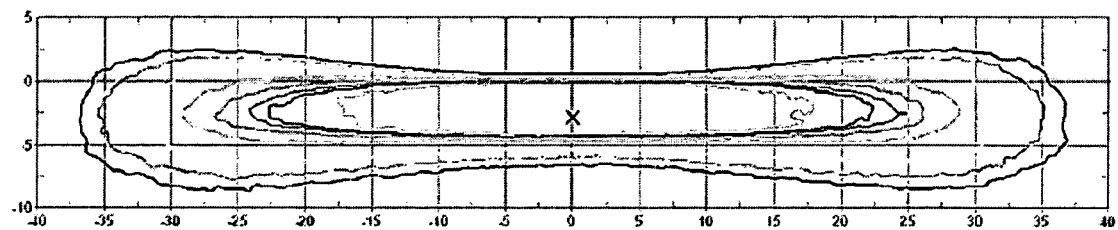
FIG. 3 shows a resulting beam pattern produced by light emitted from the lens of the assembly of FIG. 1.

Many automotive lighting systems require the production of specific light patterns, such as headlamp beam patterns, driving lamp patterns or fog lamp patterns with specific shapes and characteristics which are determined by regulation or need. In particular, many automotive lighting needs require beam patterns wherein the emitted light is spread horizontally but constrained vertically. Accordingly, in the embodiment of FIG. 1, lens 40 is preferably generally D-shaped in cross section such that light entering lens 40 from light pipe 36 is constrained vertically and spread horizontally, relative to the orientation of lens 40 in FIG. 1, as best seen in FIGS. 2 and 3.

Figure 4:
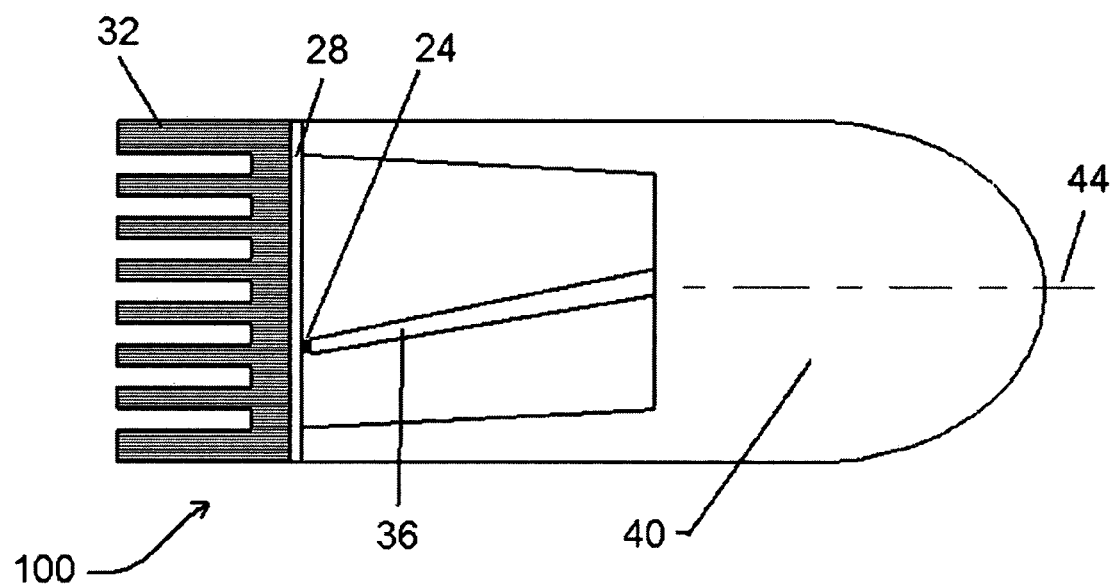
FIG. 4 shows a side view of another embodiment of a modular semiconductor light source assembly in accordance with the present invention.
Figure 5:
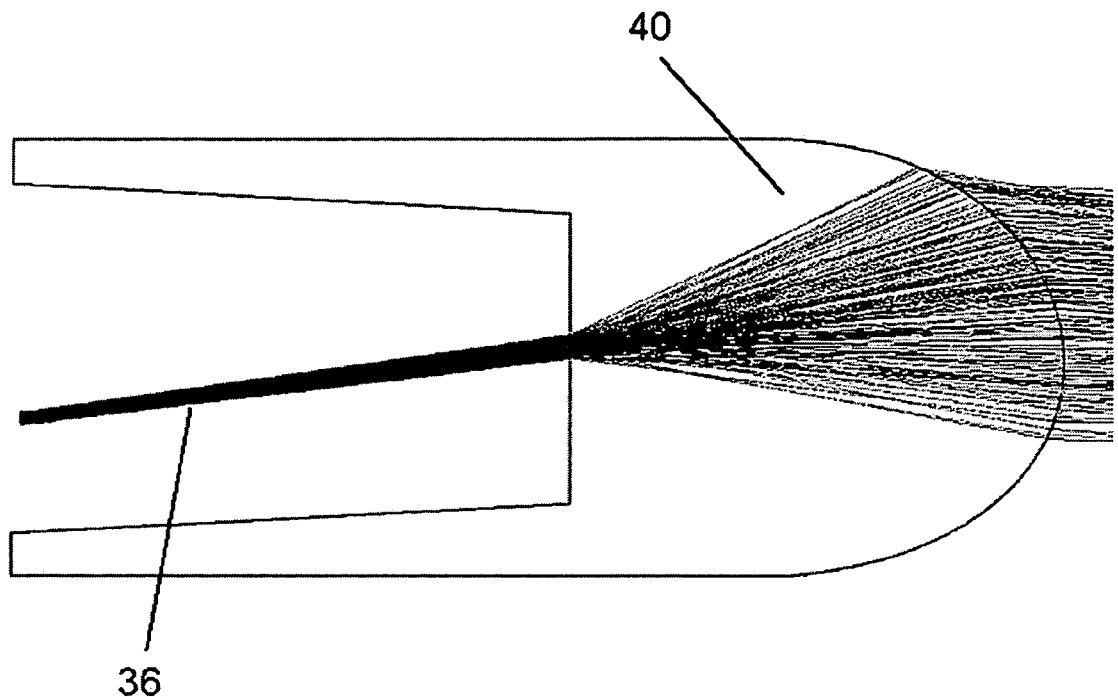
FIG. 5 shows a ray diagram illustrating the refraction of light through a light pipe and lens of the assembly of FIG. 4.
Figure 6:
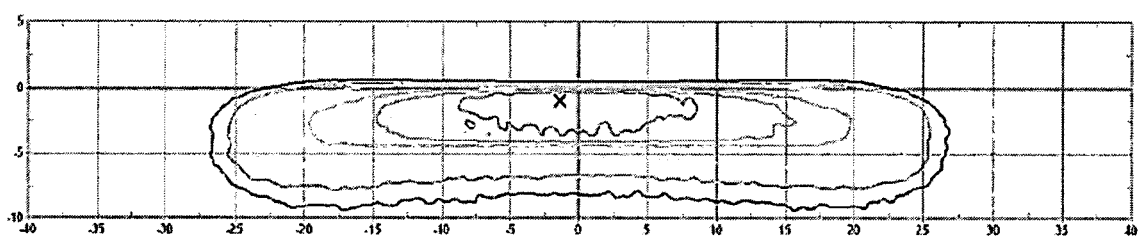
FIG. 6 shows a resulting beam pattern produced by light emitted from the lens of the assembly of FIG. 4.

FIG. 4 shows another embodiment of a modular semiconductor light source assembly 100 in accordance with the present invention wherein components which are similar to those of the embodiment of FIG. 1 are indicated with like reference numerals. As shown, in this embodiment LED 24 is located on substrate 28 offset from the vertical centerline 44 of lens 40. While light pipe 36 still transfers substantially all of the light emitted by LED 24 to lens 40, the offset (or tilt) of the centerline of light pipe 36 with respect to the centerline of lens 40 results in the modified beam pattern illustrated in FIGS. 5 and 6. As can be seen, by offsetting LED 24 below the centerline of lens 40, the resulting beam pattern of light emitted from lens 40 is further constrained vertically.

As will now be apparent to those of skill in the art, LED 24 and light pipe 36 can be positioned in a variety of locations with respect to vertical centerline 44 to alter the vertical constraint of the beam pattern produced by modular semiconductor light source assembly 100.

Figure 7:
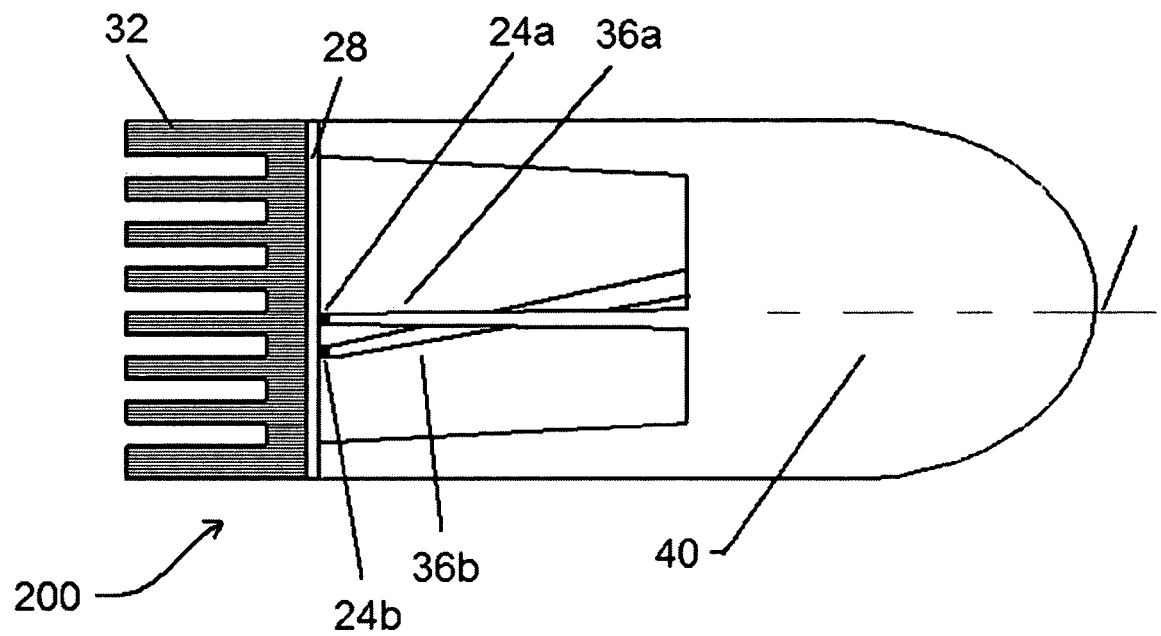
FIG. 7 shows a side view of yet another embodiment of a modular semiconductor light source assembly in accordance with the present invention.

FIG. 7 shows yet another embodiment of a modular semiconductor light source assembly 200 in accordance with the present invention wherein components which are similar to those of the embodiments of FIG. 1 and 4 are indicated with like reference numerals. As shown in this embodiment, substrate 28 includes two LEDs 24a, 24b mounted on it, each with a respective light pipe 36a, 36b to transfer the light produced by the respective LED 24a, 24b to lens 40. By positioning LEDs 24a and 24b appropriately on substrate 28, one or both of light pipes 36a and 36b can be offset with respect to vertical centerline 44. Thus assembly 200 can produce beam patterns from the combined outputs of LEDs 24a and 24b and larger patterns can be formed or patterns can be formed with relative "hotspots" wherein the light from LEDs 24a and 24b overlap in the pattern.

Figure 8:
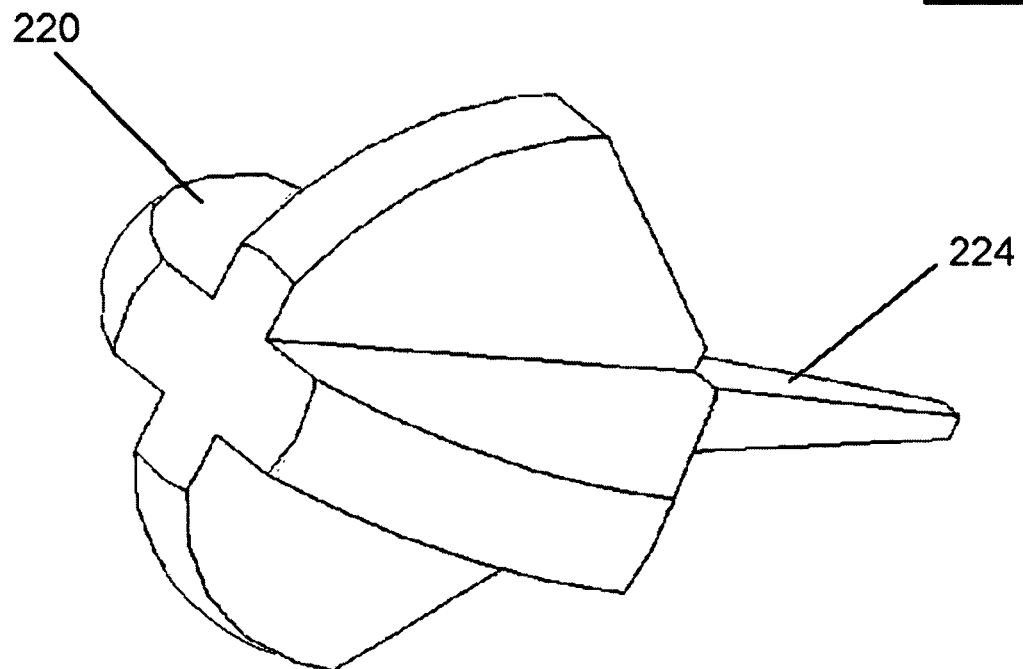
FIG. 8 shows another embodiment of a lens and light pipe for use with a modular semiconductor light source assembly in accordance with the present invention.

FIG. 8 shows another embodiment of a lens 220 for use with assemblies 20, 100 and/or 200. As illustrated, lens 220 is generally cruciform in cross section, comprising a pair of orthogonally oriented D-shaped members, each similar to lens 40. Lens 220 thus can create a beam pattern which is constrained both horizontally and vertically. If the centerline of light pipe 224, which transfers light emitted by LED 24 is located at the centerline of each of the D-shaped members, then the resulting beam pattern is generally square. However, other shaped beam patterns can easily be obtained by moving the centerline position of light pipe 224 with respect to the centerline of each of the D-shaped members forming lens 220.

Figure 9:
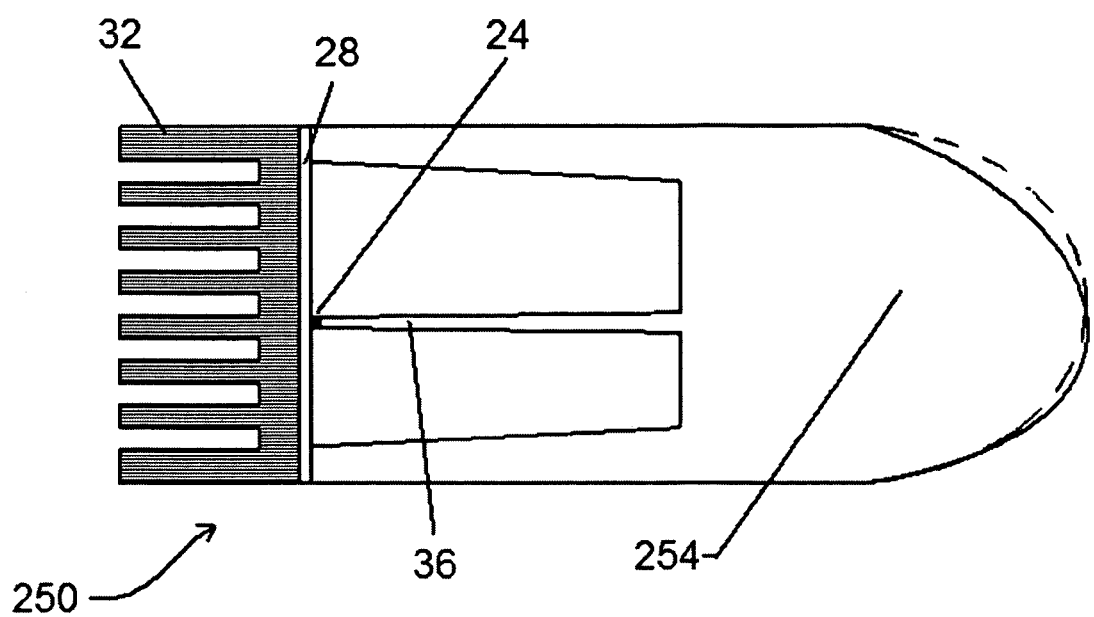
FIG. 9 shows another embodiment of a modular semiconductor light source assembly in accordance with the present invention.

FIG. 9 shows another embodiment of a modular semiconductor light source assembly 250 which, as can be seen, is similar to modular semiconductor light source assembly 20 and wherein similar components are indicated with like reference numerals to those utilized in FIG. 1. As shown, in assembly 250 the "D" shape of lens 254 has been somewhat distorted with respect to the regular elliptical shape (shown in dashed line) of lens 40 of assembly 20. Specifically, lens 254 has been extended forward at its lower edge and withdrawn at its upper edge with respect to the regular elliptical shape (shown in dashed line) of lens 40 of assembly 20. Such a non-elliptical shape will vertically constrain the light emitted by assembly 250 such that more light is emitted from the lower portion of lens 254 than the upper portion of lens 254. Assembly 250, or similar non-elliptical assemblies, can be preferred for use in constructing light fixtures such as fog lamps or driving lamps wherein it is preferred or required that the resulting light pattern provide a larger proportion of the light in the lower part of the light pattern. Further, assembly 250 can employ an offset light pipe 36 to further direct the light emitting form assembly 250.

While not illustrated, it should be apparent to those of skill in the art that lens 254 can have a wide range of non-elliptical shapes to achieved desired light emission patterns. Further, lens 254 need not be regularly shaped and can include, for example, one or more facets in the non-elliptical shape, such facets providing areas of reduced light in the resulting light pattern. A variety of other shapes of lens 254 and or patterns of facets or other light focusing structures for lens 254 can be employed as will occur to those of skill in the art and the terms "generally D-shaped" or "general D-shape" used herein are intended to comprise all such shapes.

As should now be apparent, desired beam patterns can advantageously be formed with combinations of the above-described modular light source assemblies and/or other light sources.

Figure 10:
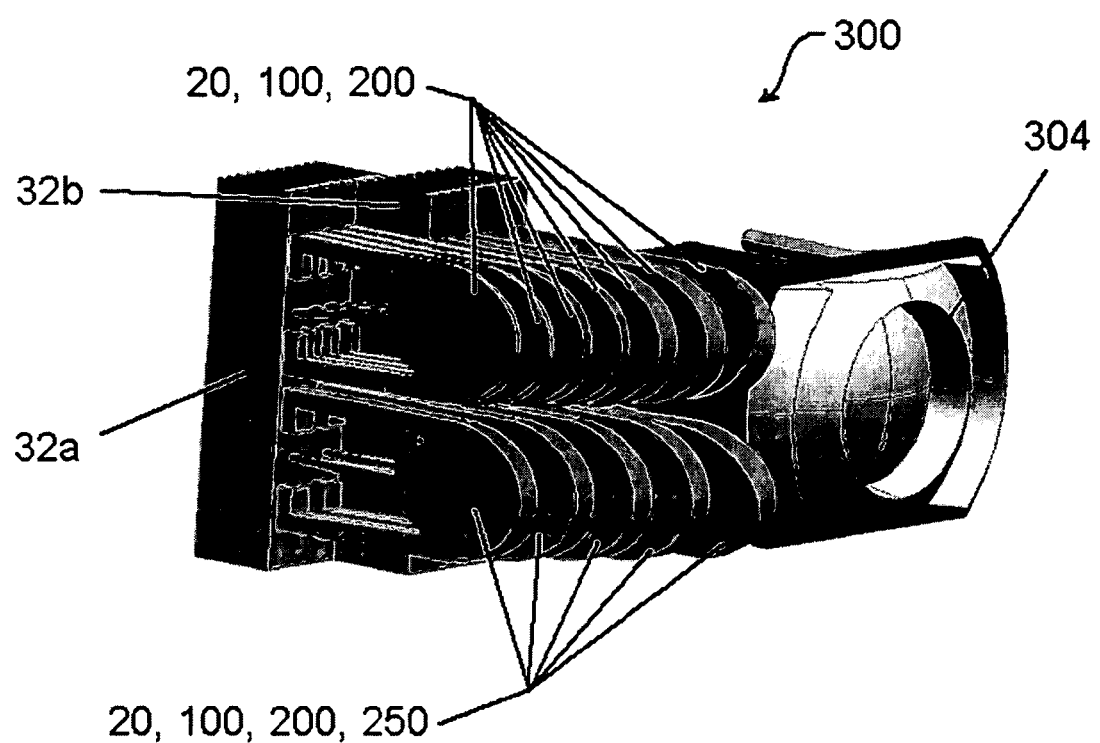
FIG. 10 shows an automotive headlamp fixture constructed with modular semiconductor light source assemblies in accordance with the present invention.

FIG. 10 shows a headlamp fixture 300 which has been constructed from a combination of assemblies 20, 100, 200 and/or 250 and a projector device 304, such as that described in co-pending U.S. application Ser. No. 11/290,853 filed on Nov. 30, 2005 and assigned to the assignee of the present invention. Projector device 304 provides areas of high intensity light for the desired beam pattern while modular semiconductor light source assemblies 20, 100, 200 or 250 provide spread light for the desired beam pattern. As mentioned above, when multiple assemblies 20, 100, 200 and/or 250 are employed in a fixture, such as headlamp fixture 300, two or more assemblies 20, 100, 200 and/or 250 can share a common heat sink. In the illustrated fixture 300, two of assemblies 20, 100, 200 and/or 250 of the bottom tier and four of the assemblies 20, 100, 200 and/or 250 of the top tier share heat sink 32a, while the remaining three of assemblies 20, 100, 200 and/or 250 of the bottom tier and three of the assemblies 20, 100, 200 and/or 250 of the top tier share heat sink 32b.

Some of assemblies 20, 100, 200 or 250 can be employed to provide fill light for desired beam patterns while projector device 304 can provide any necessary hotspots for those beam patterns. For example, the bottom five assemblies 20, 100, 200 or 250 can be used for producing fill light for a low beam headlamp pattern while the top seven assemblies 20, 100, 200 or 250 can be used for producing fill light for a high beam headlamp pattern. Alternatively, or in addition, one or more of assemblies 20, 100, 200 or 250 can be illuminated when the steering wheels of the vehicle are turned to provide steering light to illuminate the road in the direction the vehicle will travel.

As will be apparent from FIG. 10, the thickness of lens 40 or 254 in assemblies 20, 100, 200 and/or 250 can be varied to alter the horizontal spread of the beam pattern produced by assemblies 20, 100, 200 and/or 250. In fixture 300, some of assemblies 20, 100, 200 and/or 250 have relatively thick lenses 40 or 254, while others have relatively thin lenses 40 or 254 to obtain the desired beam pattern.

Figure 11:
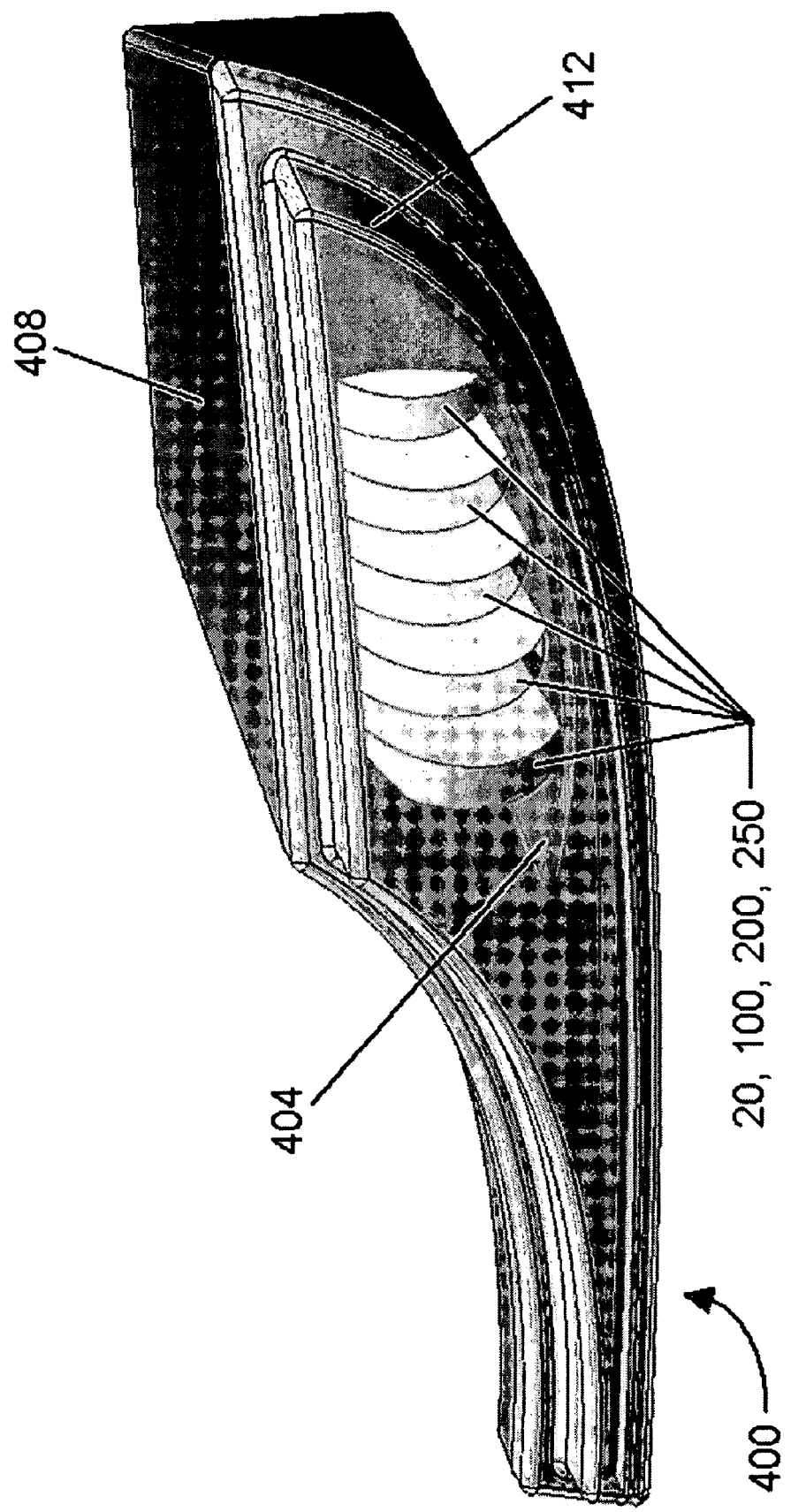
FIG. 11 shows an automotive driving or fog lamp fixture constructed with modular semiconductor light source assemblies in accordance with the present invention.

In addition to headlamp fixtures, it is contemplated that a variety of other automotive lighting systems can be constructed with modular semiconductor light source assemblies in accordance with the present invention, including taillight fixtures and/or daytime running light fixtures. For example, FIGS. 11 and 12 show a lighting fixture 400 which can be used as a Fog Lamp or Driving Lamp. As illustrated, fixture 400 includes five modular semiconductor light source assemblies 20, 100, 200 or 250 which can be each of one type, e.g.—five instances of modular semiconductor light source assembly 20, or which can include two or more different types of modular light source assemblies, e.g.—one of modular semiconductor light source assembly 20, three modular semiconductor light source assemblies 100 and two modular semiconductor light source assemblies 200 to produce a desired emitted beam pattern from fixture 400.

Each of the modular semiconductor light source assemblies 20, 100, 200 or 250 are mounted through a bezel 404 which is in turn mounted within a fixture body 408 and enclosed by a clear lens 412. While in the illustrated embodiment the lenses of each modular semiconductor light source assembly 20, 100, 200 or 250 are mounted substantially parallel to each other it is contemplated that one or more of the modular semiconductor light source assemblies can be mounted in fixture 400 with their respective lenses angled horizontally to spread or "wrap" the beam pattern produced to the front and side of the motor vehicle, etc. as required for the particular desired beam pattern.

As will be apparent from FIGS. 10 and 11, the use of modular semiconductor light source assemblies 20, 100, 200 or 250 permit a variety of stylistic light fixtures to be created, as desired.

The present invention provide a modular semiconductor light source assembly which includes a semiconductor light source, such as a light emitting diode, which is mounted on a substrate which supplies electricity to the light source and which assists in removing waste heat therefrom. Substantially all of the light emitted by the LED is transferred to a lens by a light pipe, the cross section of the light pipe increasing from the light source to the lens and the lens having a general D-shape such that the light pattern formed by the lens is constrained in a first direction orthogonal to a second direction. The assembly can be combined with other similar assemblies or other light sources in a light fixture to produce a desired overall beam pattern such as an automobile headlamp low beam or high beam pattern.

The above-described embodiments of the invention are intended to be examples of the present invention and alterations and modifications may be effected thereto, by those of skill in the art, without departing from the scope of the invention which is defined solely by the claims appended hereto.

We claim:

1. A modular semiconductor light source assembly comprising:
   a substrate;
   a semiconductor light source mounted to the substrate, the substrate providing electrical power to the semiconductor light source and removing waste heat generated by the semiconductor light source;
   a heat sink in thermal communication with the substrate to remove waste heat therefrom;
   a light pipe having a first end adjacent the semiconductor light source, to capture substantially all of the light emitted from the semiconductor light source, and a second end; and
   a lens having a general D-shape, the second end of the light pipe engaging the lens such that the light from the semiconductor light source is emitted from the lens in a pattern wherein the emitted light is spread in a first direction and is constrained in a second direction, the second direction being orthogonal to the first.

2. The modular semiconductor light source assembly of claim 1, wherein the semiconductor light source is a light emitting diode.

3. The modular semiconductor light source assembly of claim 1, wherein the cross-sectional area of the light pipe increases from the first end to the second end.

4. The modular semiconductor light source assembly of claim 1, wherein the centerline of the light pipe is offset from the centerline of the lens to further constrain the pattern of the light emitted from the lens.

5. The modular semiconductor light source assembly of claim 1, further comprising a second semiconductor light source mounted to the substrate and a second light pipe to transfer light emitted from the second semiconductor light source to the lens.

6. The modular semiconductor light source assembly of claim 1, wherein the lens is cruciform in shape with each arm of the cruciform being generally D-shaped such that the light from the emitted by the semiconductor light source is emitted from the lens in a pattern wherein the emitted light is constrained in both first and second orthogonal directions.

7. The modular semiconductor light source assembly of claim 1, further comprising a projector light source and at least one modular semiconductor light source assembly.

8. The modular semiconductor light source assembly of claim 7, further comprising at least two modular semiconductor light source assemblies, each of the modular semiconductor light source assemblies being thermally connected to a common heat sink.

9. The modular semiconductor light source assembly of claim 1, further comprising a driving lamp or fog lamp fixture having at least two modular semiconductor light source assemblies arranged to produce a desired light beam pattern.

10. A headlamp fixture, comprising:
one or more modular semiconductor light source assemblies, the one or more modular semiconductor light source assemblies having a semiconductor light source, a lens having a general D-shape used in conjunction with a light pipe having a first end and a second end, the second end of the light pipe engaging the lens such that the light from the semiconductor light source is emitted from the lens in a pattern wherein the emitted light is spread in a first direction and is constrained in a second direction, the second direction being orthogonal to the first; and
a projector light source, operably associated with the one or more modular semiconductor light source assemblies.

11. The headlamp fixture of claim 10, said modular semiconductor light source assemblies further comprising of:
a substrate upon which the semiconductor light source is mounted;
a heat sink in thermal communication with the substrate to remove waste heat therefrom;
wherein the first end of the light pipe is used to capture substantially all of the light emitted from the semiconductor light source.

12. The headlamp fixture of claim 10, wherein the thickness of the lens can be varied to alter the horizontal spread of the beam patterns produced by the one or more modular semiconductor light source assemblies.

13. The headlamp fixture of claim 12, wherein the lens of each of the one or more modular semiconductor light source assemblies is made relatively thicker and used in combination with the lens of each of the one or more modular semiconductor light source assemblies which is made relatively thinner to produce a desired beam pattern.

14. The headlamp fixture of claim 10, wherein the one or more modular semiconductor light source assemblies can be employed to provide fill light for a beam pattern, and the projector light source can provide hotspots for the beam pattern.

15. The headlamp fixture of claim 14, wherein the one or more modular semiconductor light source assemblies are used to provide light to illuminate a road in the direction a vehicle will travel.

16. The headlamp fixture of claim 10, wherein the one or more modular semiconductor light source assemblies are used as one selected from a group comprising: a taillight fixture for a vehicle, a daytime running light for a vehicle, a fog lamp or a driving lamp.

17. The headlamp fixture of claim 10, wherein the one or more modular semiconductor light source assemblies are mounted through a bezel, the bezel is mounted within a fixture body and enclosed by a clear lens.

18. The headlamp fixture of claim 10, wherein the one or more modular semiconductor light source assemblies are positioned such that each lens of the one or more modular semiconductor light source assemblies is angled horizontally to spread the beam pattern produced to different areas surrounding a vehicle.

19. A modular semiconductor light source assembly comprising:
a substrate;
a semiconductor light source mounted to the substrate, the substrate providing electrical power to the semiconductor light source and removing waste heat generated by the semiconductor light source;
a heat sink in thermal communication with the substrate to remove waste heat therefrom;
a light pipe having a first end adjacent the semiconductor light source, to capture substantially all of the light emitted from the semiconductor light source, and a second end; and
a lens having a general D-shape, the second end of the light pipe engaging the lens such that the light from the semiconductor light source is emitted from the lens in a pattern, wherein the emitted light is spread in a first direction and is constrained in a second direction, the second direction being orthogonal to the first, and wherein the centerline of the light pipe is offset from the centerline of the lens to further constrain the pattern of the light emitted from the lens.

20. A headlamp fixture, comprising:
one or more modular semiconductor light source assemblies; and
a projector light source, operably associated with the one or more modular semiconductor light source assemblies, the one or more modular semiconductor light source assemblies further comprising a semiconductor light source, and a lens having a general D-shape used in conjunction with a light pipe having a first end and a second end, the second end of the light pipe engaging the lens such that the light from the semiconductor light source is emitted from the lens in a pattern, wherein the emitted light is spread in a first direction and is constrained in a second direction, the second direction being orthogonal to the first, and wherein the thickness of the lens can be varied to alter the horizontal spread of the beam patterns produced by the one or more modular semiconductor light source assemblies.

21. The headlamp fixture of claim 20, wherein the lens of each of the one or more modular semiconductor light source assemblies is made relatively thicker and used in combination with the lens of each of the one or more modular semiconductor light source assemblies which is made relatively thinner to produce a desired beam pattern.

* * * * *